United States Patent [19]

Ahnemiller et al.

[11] Patent Number: 4,525,487
[45] Date of Patent: Jun. 25, 1985

[54] METHOD FOR MAKING POLYESTER RESIN FOAM BY SPRAYING

[75] Inventors: James Ahnemiller, Middlebury; Warren J. Peascoe, Woodbridge, both of Conn.

[73] Assignee: Uniroyal, Inc., Middlebury, Conn.

[21] Appl. No.: 522,125

[22] Filed: Aug. 11, 1983

[51] Int. Cl.³ .............................................. C08J 9/10
[52] U.S. Cl. ...................................... 521/78; 521/79; 521/80; 521/81; 521/94; 521/128; 521/138
[58] Field of Search ................... 521/138, 78, 94, 79, 521/81

[56] References Cited

U.S. PATENT DOCUMENTS 3,920,591 11/1975 Jacobs et al. ...................... 521/138
4,327,196 4/1982 West et al. ......................... 521/138
4,401,771 8/1983 Ahnemiller ....................... 521/138

Primary Examiner—Morton Foelak
Attorney, Agent, or Firm—John A. Shedden

[57] ABSTRACT

A spray method for making cured polyester resin foam is provided using a liquid unsaturated polyester resin, a sulfonyl hydrazide, an effective amount of a promoter, an effective amount of a catalyst and 0.005–3 parts quaternary ammonium salt.

5 Claims, No Drawings

METHOD FOR MAKING POLYESTER RESIN FOAM BY SPRAYING

The present invention provides a spray method for expanding and curing an unsaturated polyester resin using a catalyst, an organic metal salt promoter, a substituted mono-sulfonyl hydrazide blowing agent and a quaternary ammonium salt modifier.

The use of sulfonyl hydrazide for preparing polyester foams is known in the prior art:

U.S. Pat. No. 3,920,589, Nov. 18, 1975 (Jacobs et al) teaches the expanding and curing of unsaturated polyester resins using a sulfonyl hydrazide blowing agent, a cobalt accelerator, a peroxide catalyst and certain redox halogen-containing compounds such as hydrogen iodide, ferric chloride, etc. No mention is made of the use of quaternary ammonium modifiers.

U.S. Pat. No. 3,920,590, Nov. 18, 1975 (Jacobs et al) deals with the preparation of crosslinked polyester foams by means of a high level of peroxide curing agent, a sulfonyl hydrazide blowing agent and cobalt promoter. Quaternary ammonium salt modifiers are not disclosed.

U.S. Pat. No. 3,920,591, Nov. 18, 1975 (Jacobs et al) discloses a method for making cured polyester foams using a sulfonyl hydrazide blowing agent, a peroxide catalyst, a cobalt accelerator and a redox amine compound, such as alkylamines, ethyl substituted heterocyclic amines, ammonia, etc. With regard to quaternary amines, it is specifically stated (col. 7, lines 51–59) that they are not within the definition of useful amines since they cause physical defects in the foams, such as cracking and splitting (see col. 8, lines 15–17).

U.S. Pat. No. 4,327,196, Apr. 27, 1982 (West et al) teaches a method for expanding and crosslinking polyester resins employing substituted mono-sulfonyl hydrazide, a peroxide catalyst, and certain primary promoters, such as copper naphthenate, optionally with a secondary promoter, such as a cobalt compound. No mention is made of quaternary ammonium salts.

Employing a spraying method it has now been unexpectedly found that cured, low density foams can be prepared from unsaturated polyester resins using certain quaternary ammonium salts in combination with substituted sulfonyl hydrazides and conventional curing agents. In addition, it has been found that quaternary ammonium salts provide beneficial effects leading to lower density foams.

Specifically, this invention provides low density foams prepared from liquid ethylenically unsaturated polyester resins by blending and spraying the following ingredients as outlined in Table A below:
(a) liquid unsaturated polyester resin
(b) substituted sulfonyl hydrazide
(c) organic metal salt promoter
(d) catalyst
(e) quaternary ammonium salt
(f) filler, and
(g) surface active agent
wherein the concentrations of (b) through (g) are indicated in Table A below (in parts per 100 parts of polyester resin, all by weight).

TABLE A

| Ingredient | b | c | d | e | f | g |
| --- | --- | --- | --- | --- | --- | --- |
| General | 0.25–10 | 0.05–5 | 0.5–5 | 0.005–3 | 0–250 | 0–2 |
| Preferred | 0.5–8 | 0.1–4 | 1–3 | 0.025–2 | 0–150 | 0.1–1.5 |
| Most preferred | 1.0–5 | 0.1–2 | 1–2 | 0.04–1 | 0–100 | 0.15–1.25 |

It will be understood that the above ranges represent guidelines; the practitioner may vary the concentrations of ingredients depending on particular results desired, such as gel time, foam density and the like or the amount of filler added. In the latter case, usually larger amounts of active ingredients per 100 parts of resin are required.

The liquid unsaturated polyester resins in the composition comprise a linear or only slightly branched polyester resin and an ethylenically unsaturated monomeric compound. The resin per se is typically prepared as a condensation or polyesterification reaction product of an unsaturated polybasic and a polyhydric compound; for example, the condensation product of a dibasic acid having alpha-beta ethylenic unsaturation with a di- or trihydric compound, such as a glycol. Often a saturated polybasic acid or anhydride, such as a dibasic acid, is employed with the unsaturated acid or anhydride to modify the reactivity of the unsaturated resin.

Examples of saturated polybasic acids include, but are not limited to: isophthalic acid; orthophthalic acid, terephthalic acid, tetrabromophthalic acid, tetrachlorophthalic acid, tetrahydrophthalic acid, adipic acid, succinic acid, azelaic acid, glutaric acid, nadic acid and the various anhydrides obtained therefrom. Unsaturated polybasic acids include, but are not limited to: maleic acid, fumaric acid, itaconic acid, citraconic acid and anhydrides obtained therefrom.

At times, unsaturated acid or anhydride substituted bridged ring polyenes are used to modify cure characteristics of the resins.

Typical polyhydric alcohols include, but are not limited to: ethylene glycol, 1,2-propanediol; 1,3-propanediol, diethylene glycol, dipropylene glycol, triethylene glycol, tripropylene glycol, 1,2-butanediol, 1,3-butanediol, 1,4-butanediol, neopentyl glycol, 2,2,5-trimethylpentane diol, cyclohexanedimethylol, dibromoneopentyl glycol, dibromobutane diol, trimethylolpropane, pentacrythrito, dipropoxy adducts of bisphenol A, and dipropoxy adducts of hydrogenated bisphenol A.

Examples of ethylenically unsaturated monomers employed with the linear polyesters include, but are not limited to: styrene, vinyl toluene, acrylates and methacrylates like methyl methacrylate, alpha-methylstyrene, chlorostyrene, and diallyl phthalate. The ratio of the resin per se to unsaturated monomer may vary from 75/25 to b 50/50 by weight. See, for example, U.S. Pat. Nos. 2,255,313, Ellis, Sept. 9, 1941, 2,667,430, Wells, Jan. 26, 1954; or 3,267,055, Amidon, Aug. 15, 1966, for further details of suitable polyester compositions comprising an unsaturated linear or slightly branched polyester and a copolymerizable ethylenic monomer which is a solvent for the polyester to provide a liquid composition capable of cross-linking to a solid state in the presence of a peroxide or hydroperoxide catalyst or polymerization initiator. (Unless otherwise indicated, the expressions "polyester" or "polyester resin" as used herein have reference to such a composition.)

The liquid unsaturated polyester resins also typically contain small amounts of inhibitors in order to prevent premature reaction, such as hydroquinone, quinone and tertiary butyl catechol, as well as a wide variety of other additives, such as: viscosity index improvers, rheological agents, flame retardants, thermoplastic polymers, pigments, dyes, stabilizers, glass fibers, release agents, extenders, alumina, surfactants and other additives. Fillers may also be included in polyester resins, such as hollow glass or plastic microsphere beads, wood flour, silica, diatomaceous earth, ground glass, etc. Filler levels may be as high as 70 percent by weight, usually 0 to 60 percent.

The various components of the polyester resins may be varied as is known in the art to impart the desired properties to the cured resin. Flexible resins employ greater amounts of adipates or azelates, while more rigid resins use phthalates, with a variety of different glycols. This invention is useful for making rigid and semi-rigid polyester foams suitable as structural-type foams. Such resins have a formulation, for example, of about 3 to 5 moles of glycol, 1.5 to 3.0 moles of adipic acid, and 0 to 1.5 moles of phthalic anhydride, with from 1.0 to 2.5 moles of styrene or vinyl toluene.

Resins containing higher amounts of linear dibasic glycols and linear dibasic acids, e.g., over 70%, while maintaining a low amount of aromatic dihydric acids and anhydrides, unsaturated acids, and monomers, exhibit a higher degree of elasticity. Formulating for these properties becomes limited by the desired rigidity and heat resistance properties of the finished foam product.

The liquid unsaturated polyester resins are cured using a catalyst. The catalyst is usually an organic (hydro-) peroxide. Such peroxides are characterized by their reaction with metal salts or metal soaps which are a general class of agents known as promoter. Suitable peroxides include, but are not limited to: saturated aliphatic hydroperoxides, olefinic hydroperoxides, aralkyl hydroperoxides, hydroperoxides of cycloaliphatic and heterocyclic organic molecules, dialkyl peroxides, transanular peroxides, peroxyesters, peroxy derivatives of aldehydes and ketones, hydroxyalkyl hydroperoxides, bis(hydroalkyl) peroxides, polyalkylidene peroxides, peroxy acetals, methyl hydroperoxide, ethyl hydroperoxide, t-butyl hydroperoxide, dimeric benzaldehyde peroxide, dimeric benzophenone peroxide, dimeric acetone peroxide, methyl ethyl ketone hydroperoxide, etc.

It should be noted that these organic (hydro-) peroxides are not available in commerce at 100 percent concentrations. Rather, they are used diluted in a suitable carrier such as an organic solvent. In addition, the so-called active oxygen content of such commercial peroxides may vary depending on the type of peroxides as well as storage condition and age. Nevertheless, the amounts of peroxide stated reflect the total peroxide compositions usually containing about 50% peroxide compound. Proper adjustment of peroxide concentrations in the polyester resins may have to be made when using peroxide compositions containing substantially lower levels of active peroxide (for further information see Jacyzyn et al, "Methyl ethyl ketone peroxides, relationship of reactivity to chemical structure," paper presented at 32nd Annual Technical Conference, 1977 Society of the Plastics Industry).

Preferred peroxides are alkoxy peroxides which are activated at relatively low or ambient temperature, i.e., as low as 15° C., normally at about 20°-50° C. The most preferred peroxide is methyl ethyl ketone peroxide.

Catalysts suitable for this invention also include alkali metal or alkaline earth metal percarbonates, perborates and perphosphates, such as sodium percarbonates, potassium perborate, lithium perphosphates, such as sodium percarbonates, potassium perborate, lithium perphosphate, magnesium percarbonate, calcium perphosphate, barium perborate and the like. Mixtures of oxidizing agents may also be employed, such as hydrogen peroxide, an organic peroxide and a perborate.

The promoter of the invention may be an organic metal salt participating in the curing and expansion of the polyester resin composition and causing gelation of such compositions. The organic anions of such salts may be derived from a variety of organic acids having from two to 20 carbon atoms and include acetic acid, propionic acid, butyric acid, 2-ethylhexanoic acid, hexanoic acid, octoic acid, lauric acid, oleic acid, linoleic acid, palmitic acid, stearic acid, naphthenic acid; also complexes of such metals with acetoacetone. The preferred promoters are salts based on copper and cobalt, especially 2-ethylhexanoate, octoate and naphthenate. Promoters may also be organic salts obtained from cadmium, manganese, tin, lead, zirconium, chromium, lithium, calcium, nickel, iron and potassium, and organic acids outlined above. Examples of such promoters are cobalt octoate and naphthenate. Usually the metal concentration of commercially available promoters ranges from 8–12% by weight. Adjustments of required levels may be necessary if such concentration is substantially outside that range.

The chemical blowing agents suitable for preparing the foamed and cured polyester are substituted sulfonyl hydrazide having the structural formula $R(SO_2NHNH_2)$, wherein r has a value of 1 or 2; and if r is 2, R is $C_2$–$C_{10}$ alkylene, phenylene, biphenylene, oxybisbenzene or methylenebisbenzene radical; and if r equals 1, R is from $C_1$–$C_{12}$ alkyl, $C_5$–$C_6$ cycloalkyl, $C_7$–$C_{10}$ aralkyl, phenyl, naphthyl, also phenyl substituted with halogen, $C_1$–$C_{12}$ alkyl, or $C_1$–$C_{14}$ alkoxy. Especially suitable are such sulfonyl hydrazides wherein R is $C_2$–$C_4$ alkyl, benzyl, phenyl substituted with chlorine or $C_1$–$C_{12}$ alkyl. Examples of suitable sulfonyl hydrazides are oxybis(benzenesulfonyl hydrazide), methylenebis(benzenesulfonyl hydrazide), biphenylenebis(sulfonyl hydrazide), ethylenebis(sulfonyl hydrazide), methanesulfonyl hydrazide, ethanefulfonyl hydrazide, 1- or 2-propanesulfonyl hydrazide, n-butanesulfonyl hydrazide, sec-butanesulfonyl hydrazide, tert-butanesulfonyl hydrazide, isobutanesulfonyl hydrazide, pentanesulfonyl hydrazide, hexanesulfonyl hydrazide, heptanesulfonyl hydrazide, octanesulfonyl hydrazide, nonanesulfonyl hydrazide, decanesulfonyl hydrazide, dodeanesulfone hydrazide, cyclopentanesulfonyl hydrazide, cyclohexanesulfonyl hydrazide, benzenesulfonyl hydrazide, naphthalenesulfonyl hydrazide, toluenesulfonyl hydrazide, ethylbenzenesulfonyl hydrazide, dimethylbenzenesulfonyl hydrazide, butylbenzenesulfonyl hydrazide, hexylbenzenesulfonyl hydrazide, oxtylbenzenesulfonyl hydrazide decylbenzenesulfonyl hydrazide, dodecylbenzenesulfonyl hydrazide, methoxybenzenesulfonyl hydrazide, ethoxybenzenesulfonyl hydrazide, butoxybenzenesulfonyl hydrazide, chlorobenzenesulfonyl hydrazide, fluorobenzenesulfonyl hydrazide, bromobenzenesulfonyl hydrazide, iodobenzenesulfonyl hydrazide, benzylsulfonyl hydrazide, phenethanesulfonyl hydrazide, phenylpropanesulfonyl hydrazide, phenylbutanesulfonyl hydrazide, phenylhexanesulfonyl hydrazide. Mono-substituted sulfonyl hydrazides are preferred.

Surfactants suitable for making polyester foam are well known to the art. Silicone alkylene glycol co- and block co-polymers are preferred, although others are applicable such as ethoxylated alkylphenols and fluorohydrocarbons. Representative examples are nonylphenyl polyethylene glycol ether, nonylphenoxy poly(ethyleneoxy) ethanol, di-tridecyl sodium succinate, stearyl dimethylbenzylammonium chloride, block copolymers of dimethylpolysiloxane with poly(ethylene oxide) or poly(propylene oxide) and the like.

Although the effect of surface active agents is beneficial toward cell stabilization, they are not essential for carrying out the invention.

Quaternary ammonium salts useful for the purpose of this invention have the structural formula $R^4(NR^1R^2R^3)_m{}^+X_m{}^-$, wherein m equals 1 or 2, and if m is one (1), $R^1, R^2, R^3$ and $R^4$ are the same or different and are $C_1-C_{18}$ alkyl, $C_3-C_{18}$ alkenyl, $C_3-C_{18}$ alkoxyalkyl or alkylcarbonylaminoalkyl or $C_7-C_9$ aralkyl, or two of the $R^1$ to $R^4$ radicals such as $R^1$ and $R^2$ or $R^1$ and $R^3$ combined with the N atom form a $C_4-C_5$ heterocyclic saturated or unsaturated, non-aromatic moiety, and if m equals 2, $R^4$ is $C_2-C_{10}$ alkylene; X is an anion such as hydroxy, halogen (e.g. chlorine, bromine, iodine), (hydrogen) sulfite or sulfate, alkyl sulfite or sulfate wherein the alkyl group has 1–4 carbon atoms, aluminum tetrachloride, antimony hexachloride, dichromate, tetrafluoro borate, hexafluoro phosphate, oxalate, nitrate, salicilate, triphenylmethyl and the like.

For the purpose of carrying out this invention, several approaches may be taken, e.g. all of the ingredients may be premixed except for the catalyst; the latter being kept separate in a suitable carrier. These two mixtures may then be blended immediately before spraying them onto a surface or by causing blending in the spraying means or such blending may be accomplished by causing intermingling of the two separate spray streams after exiting the spraying means but before depositing on the surface has occurred. Alternatively, to a portion of the total polyester resin (10 to 90% by weight of the total polyester) may be added all the components except the catalyst, the latter being blended with a second portion the remaining 90 to 10% (of the polyester) of the resin; both portions are then mixed together. The final composition, being within the limits outlined previously, will provide the desired foamed and cured product. Variations of the above may be adopted according to the particular need and circumstance. The quaternary ammonium salt may be added at any time prior to the curing, but preferably is added before the oxidizing agent is charged. Thus, one embodiment of the invention involves initially mixing some or all of the polyester (i.e., from 10 to 100 parts of polyester) with ingredients (b), (c), (e), (f) and (g), that is, everything except the catalyst. This mixture is useful for subsequent admixture with the curative and (if less than 100 parts of polyester was used initially) with additional polyester (up to 90 parts) to bring the total amount of polyester to 100 parts.

The spraying method of this invention is most suitable for making articles of commerce such as shower stalls, bathtubs, furniture, automotive body parts, paneling, packaging, floatation articles, air conditioner and humidifier housings, snowmobile front ends, lawnmower housings; bus, truck and tractor components; laminar structures, boats, and the like.

Generally, spray application calls for short gel time, and the final product is usually made by employing either internally or externally mixing spray guns, which are well known to the art.

The expansion and cure of the polyester resin composition is effected simply by exposing the described sprayed mixture to expanding and curing conditions. For this purpose ordinary ambient conditions are suitable, since the reaction proceeds spontaneously after the ingredients are mixed. Application of heat is usually not necessary; the reaction itself is exothermic. If desired, heat may be applied, particularly in a post curing stage.

The following examples demonstrate more specifically this invention.

EXAMPLE 1

A series of experiments was conducted following substantially the procedure of U.S. Pat. No. 3,920,591. Specifically, to a 215 ml wax-coated paper cup was added while stirring 50 g polyester resin consisting of a reaction product of maleic acid (17 parts), phthalic anhydride (15 parts), dicyclopentadiene (14 parts), diethylene glycol (13 parts) and ethylene glycol (2.5 parts), which was dissolved in 38.5 parts (all by weight) styrene. To this mixture was charged one (1) part cobalt octoate (12% Co), 0.0015 pts copper naphthenate (8% Cu) and 2.5 pts methyl ethyl ketone peroxide (MEKP 60%, Lupersol [trademark] DDM) as well as blowing agent (4,4'-oxybis(benzenesulfonyl hydrazide); OBSH) and quaternary ammonium salt (QAS) as indicated in Table I.

The data in Table I confirm the finding of U.S. Pat. No. 3,920,591, i.e., splitting and cracking was observed in every instance using the method employed by said reference.

TABLE I

| Experiment No. | 1* | 2** | 3 |
| --- | --- | --- | --- |
| QAS-1[(1)], g | 1 | — | — |
| QAS-2[(2)], g | — | 1 | — |
| QAS-3[(3)], g | — | — | 1 |
| OBSH[(4)], g | 2 | 2 | 2 |
| Results | | | |
| Gel time, sec. | 110 | 115 | 20 |
| FD[(5)], g/cm³ | 0.61 | 0.58 | 0.62 |
| DR[(6)], % | 44 | 46 | 43 |
| Cracking/Splitting | yes | yes | yes |

Remarks:
[(1)]Dicocodimethylammonium chloride (75% in isopropanol)
[(2)]As (1) but in hexylene glycol
[(3)]Trimethyllaurylammonium chloride (50% in isopropanol/water 2/1 mixture)
[(4)]4,4'-oxybis(benzenesulfonyl hydrazide)
[(5)]Foam density
[(6)]Density reduction
*substantially a repeat of Experiment No. 21 of U.S. Pat. No. 3,920,591
**substantially a repeat of Experiment No. 20 of U.S. Pat. No. 3,920,591

The usefulness of quaternary ammonium salts in curable and expandable polyester resins was investigated and, unexpectedly, most satisfactory cured polyester foams were produced by the spraying method of this invention.

EXAMPLE 2

Foamed and cured polyester films are prepared in the following manner: Into one 1-liter reservoir of a spray gun (Model 200 Super Gun [trademark] made by Elder & Sons Manufacturing Co.) is placed 200 g of a mixture consisting of 100 parts resin (as in Example 1). one (1) part p-toluenesulfonyl hydrazide blowing agent, 0.02 parts copper octoate (1% Cu) 0.2 parts cobalt naphthenate, all by weight, (12% Co) and various quaternary ammonium salts as indicated in Table II; in the second reservoir of said gun, MEKP-50 is placed, and adjustments are made so that the total flow rate was about 250 g/minute at a resin/catalyst ratio of 100/2 by weight, at which rate a film is sprayed onto a waxed 18 inch×18 inch (46 cm×46 cm) Formica [trademark] panel. The resultant foamed and cured polyester films are removed from the panel and tested. The results are summarized in Table II.

TABLE II

| Experiment No | 4 | 5 | 6 | 7 | 8 |
|---|---|---|---|---|---|
| BMAH[1], ml | 1 | — | — | — | — |
| MAAC[2], ml | — | 1 | — | — | — |
| BMAC[3], ml | — | — | 1 | — | — |
| ATAC[4], ml | — | — | — | 1 | — |
| TPAC[5], ml | — | — | — | — | 1 |
| Results | | | | | |
| Gel time, sec. | 25 | 28 | 28 | 25 | 20 |
| FD, g/cm$^3$ | 0.71 | 0.51 | 0.50 | 0.49 | 0.67 |
| DR, % | 34 | 53 | 54 | 55 | 38 |

| Experiment No | 9 | 10 | 11 | 12 |
|---|---|---|---|---|
| AMBC[6], ml | 1 | — | — | — |
| BBAC[7], ml | — | 1 | — | — |
| BEAC[8], ml | — | — | 1 | — |
| Results | | | | |
| Gel time, sec. | 25 | 30 | 30 | 35 |
| FD, g/cm$^3$ | 0.55 | 0.51 | 0.48 | 0.82 |
| DR, % | 49 | 53 | 55 | 24 |

Remarks:
All QAS's used as solutions in isopropanol (50% wt) except BEAC (25%)
[1]Benzlytrimethylammonium hydroxide.
[2]Methyl tri(C$_8$-C$_{10}$ alkyl) ammonium chloride.
[3]Benzyltrimethylammonium chloride.
[4]Allyltrimethylammonium chloride.
[5]N—tallow pentamethylpropanediammonium dichloride.
[6]N—(C$_{12}$-C$_{16}$) alkyldimethylbenzylammonium chloride.
[7]Benzyltributylammonium chloride.
[8]Benzyltributylammonium chloride.

The data indicate that the addition of quaternary ammonium salts to the resin compositions allows the preparation of foamed and cured polyester resins by the spray method of this invention exhibiting improved reduction in density.

EXAMPLE 3

Effective levels of QAS are evaluated using the following general recipe

| Ingredients | Party (by weight) | Remarks |
|---|---|---|
| Polyester resin | 100 | (as in Ex. 1) |
| TSH | 1 | (as in Ex. 2) |
| Copper-8 | 0.02 | (as in Ex. 2) |
| Cobalt-12 | 0.2 | (as in Ex. 2) |
| QAS | variable | (ATAC, 50%) |
| MEKP | 1.5 | (50%) |

The procedure of Example 2 is essentially followed. The amounts of QAS as well as results are summarized in Table III. Experiments No. 20, 21 and 22 are outside the invention.

TABLE C

| Experiment No. | 13 | 14 | 15 | 16 | 17 |
|---|---|---|---|---|---|
| QAS, g | 0.5 | 0.125 | 0.1 | 0.07 | 0.04 |
| Results | | | | | |
| Gel time, sec. | 25 | 25 | 35 | 33 | 32 |
| FD, g/cm$^3$ | 0.61 | 0.69 | 0.69 | 0.80 | 0.85 |
| DR, % | 44 | 36 | 36 | 26 | 21 |

| Experiment No. | 18 | 19 | 20 | 21 | 22* |
|---|---|---|---|---|---|
| QAS, g | 0.025 | 0.005 | 0.001 | — | — |
| Results | | | | | |
| Gel time, sec. | 35 | 30 | 30 | 30 | 720 |
| FD, g/cm$^3$ | 0.94 | 0.96 | 0.97 | 0.98 | 1.08 |
| DR, % | 13 | 11 | 10 | 9 | 0 |

*No blowing agent added.

Although these runs are carried out using a recipe of relatively low blowing agent, peroxide and promoter levels (in order to increase the "sensitivity" towards QAS concentration changes) an over 10% density reduction is accomplished at only 0.005 g (0.0025 g effective QAS), whereas at 0.04 and 0.07 g QAS additions the density reductions are 21% and 26%, respectively. Minor changes of gel time over a 25-35 seconds range are observed, except where no TSH and QAS is added (720 sec.). No cracking or splitting of foam is noticeable.

EXAMPLE 4

Minimum blowing agent requirements are evaluated using the recipe below and the method outlined in Example 2. Examples 26 and 27 are outside this invention.

| Ingredients | Parts (by weight) | Remarks |
|---|---|---|
| Polyester resin | 100 | See Ex. 1 |
| QAS | 0.1 | ATAC |
| Copper-8 | 0.02 | See Ex. 1 |
| Cobalt-12 | 0.2 | See Ex. 1 |
| TSH | variable | See Table IV |
| MEKP | 1.5 | (50%) |

The various amounts of TSH used are indicated in Table IV as well as the data on the resultant foams.

TABLE IV

| Experiment No. | 23 | 24 | 25 | 26 | 27 |
|---|---|---|---|---|---|
| TSH, parts (wt) | 1.0 | 0.5 | 0.25 | 0.1 | 0 |
| Results | | | | | |
| Gel time, sec. | 30 | 30 | 30 | 35 | 315 |
| FD, g/cm$^3$ | 0.76 | 0.85 | 0.93 | 1.10 | 1.10 |
| DR, % | 31 | 23 | 15 | 0 | 0 |

From the above data it can be seen that TSH levels below about 0.25 parts per 100 parts of polyester resin become essentially ineffective for expansion.

EXAMPLE 5

Several substituted mono-sulfonyl hydrazides are evaluated using the recipe below and the method outlined in Example 2.

| Masterbatch Recipe: | Polyester Resin[1], g | 100 |
|---|---|---|
| | Cobalt-12[2], g | 0.6 |
| | Copper-8[3], g | 0.05 |
| | QAS[4], g | 0.2 |
| | Surfactant[5], g | 0.5 |
| | MEKP[6] | 2.0 |
| | Blowing agent | variable |

Remarks:
[1], [2], [3] and [6]: as in Ex. 1
[4]di(hydrogenated tallow)dimethylammonium chloride (75% in isopropanol).
[5]silicone glycol copolymer, Dow Corning DC (trademark) 193.

TABLE E

| Experiment No. | 35 | 36 | 37 | 38 | 39 |
|---|---|---|---|---|---|
| Masterbatch, g | 50 | 50 | 50 | 50 | 50 |
| DBSH, g | 3.84 | — | — | — | — |
| PTSH, g | — | 2.0 | — | — | — |
| CBSH, g | — | — | 2.24 | — | — |
| BZSH, g | — | — | — | 1.84 | — |
| ETSH, g | — | — | — | — | 1.52 |

TABLE E-continued

| Experiment No. | 35 | 36 | 37 | 38 | 39 |
|---|---|---|---|---|---|
| Results | | | | | |
| Gel time, sec. | 40 | 35 | 65 | 36 | 33 |
| FD, g/cm$^3$ | .75 | .66 | .68 | .58 | .52 |
| DR, % | 31 | 39 | 37 | 46 | 52 |

Remarks:
DBSH - dodecylbenzenesulfonyl hydrazide (MW 340)
PTSH - p-toluenesulfonyl hydrazide (186)
CBSH - p-chlorobenzenesulfonyl hydrazide (206)
BBSH - p-t-butylbenzenesulfonyl hydrazide (228)
BZSH - benzenesulfonyl hydrazide (172)
ETSH - ethanesulfonyl hydrazide (124)

The blowing agent molar concentration in the above runs is the same, namely 0.22 mols of blowing agent per 100 g of masterbatch.

What is claimed is:

1. A method for making cured and foamed polyester by spraying comprising
   (A) providing a mixture of (a) 100 parts by weight liquid unsaturated polyester resin, (b) 0.5-8 parts by weight substituted sulfonyl hydrazide blowing agent, (c) 1-4 parts by weight of an organic metal salt promoter for curing said resin, and 0.025-2 parts by weight quaternary ammonium salt;
   (B) providing a catalyst effective to causing curing and expanding the mixture of (A) and
   (C) bringing into contact the mixtures (A) and (B) and depositing the resulting blend onto a surface by spraying means;

wherein the sulfonyl hydrazide blowing agent has the formula $R(SO_2NHNH_2)_r$ where r equals 1, and R is $C_1-C_{12}$ alkyl, $C_5-C_6$ cycloalkyl, $C_7-C_{10}$ aralkyl, phenyl, naphthyl or phenyl substituted with halogen, $C_1-C_{12}$ alkyl or $C_1-C_4$ alkoxy, whereby there is formed a foam free from cracking or splitting.

2. The method of claim 1 wherein said quaternary ammonium salt has the formula $R^4(NR^1R^2R^3)_m{}^+X_m{}^-$, wherein m equals 1 or 2, and if m equals 1, $R^1$, $R^2$, $R^3$ and $R^4$ are the same or different and are $C_1-C_{18}$ alkyl, $C_3-C_{18}$ alkenyl, $C_3-C_{18}$ alkoxyalkyl, $C_3-C_{18}$ alkylcarbonylaminoalkyl or $C_7-C_9$ aralkyl, or two of $R^1$ to $R^4$ in combination with the N atom from a $C_4-C_5$ heterocyclic saturated or unsaturated non-aromatic moiety, and if n equals 2, $R^4$ is $C_2-C_{10}$ alkylene; X is an anion.

3. The method of claim 1 wherein (A) also contains 0-250 parts of filler and 0-2 parts surface active agent.

4. The method of claim 1 wherein said catalyst is an organic hydroperoxide or a mixture of the same.

5. The product obtained by the method of claim 1.

* * * * *